Nov. 30, 1954 P. R. HOSPE 2,695,486
LAWN MOWER HAVING REVERSING MECHANISM
Filed April 20, 1953 2 Sheets-Sheet 1
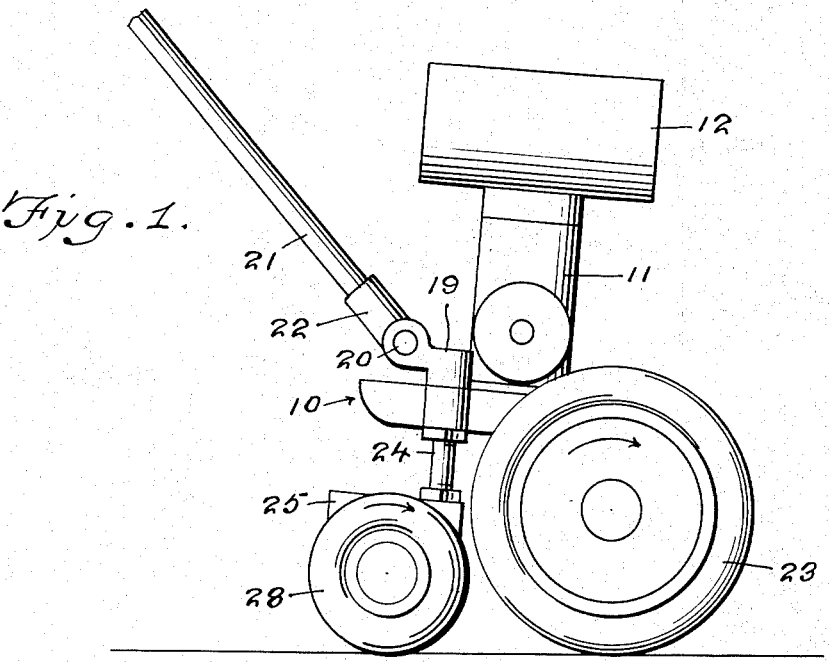
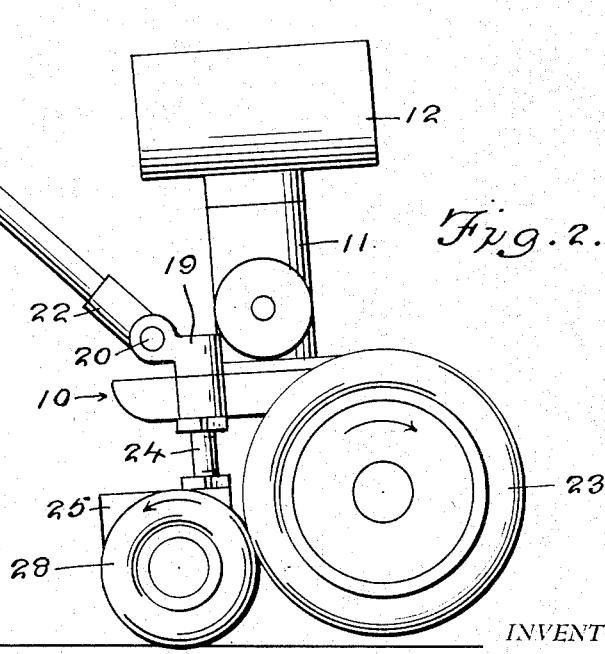
INVENTOR.
Paul R. Hospe
BY Victor J. Evans & Co.
ATTORNEYS

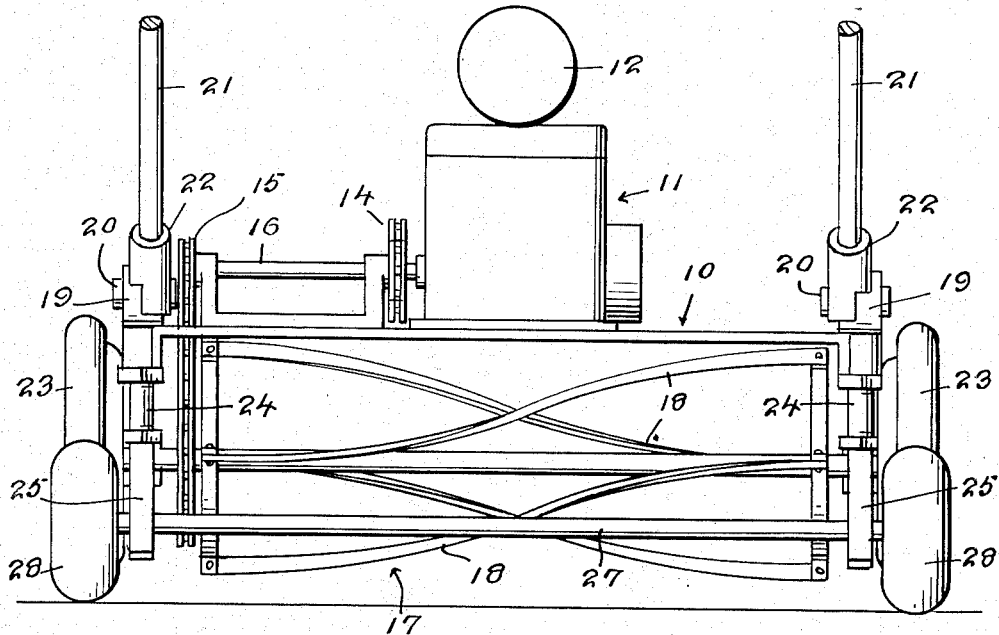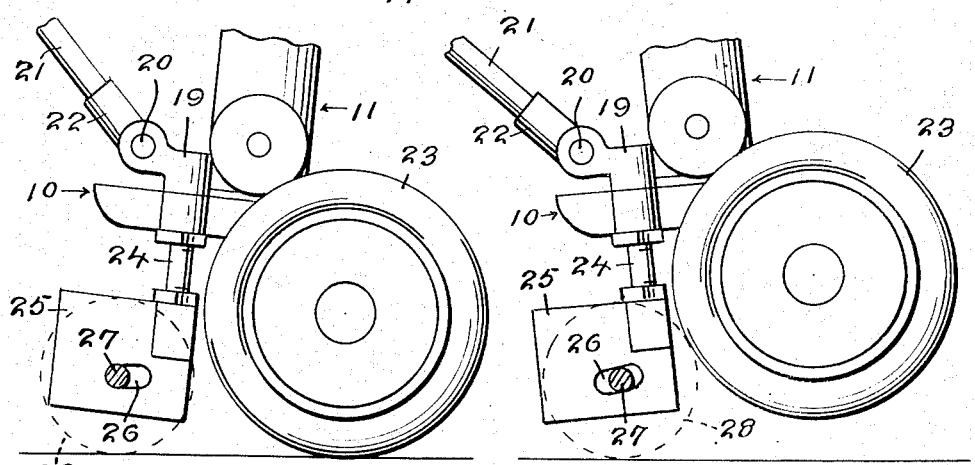

United States Patent Office 2,695,486
Patented Nov. 30, 1954

2,695,486

LAWN MOWER HAVING REVERSING MECHANISM

Paul R. Hospe, Lakeland, Fla.

Application April 20, 1953, Serial No. 349,699

4 Claims. (Cl. 56—26)

This invention relates to a lawn mower, and more particularly to a reversing mechanism for a power driven lawn mower.

The object of the invention is to provide a lawn mower which includes a novel mechanism for facilitating reversing or backing up of a power driven lawn mower.

Another object of the invention is to provide a mechanism for backing up a power driven lawn mower so that the user of the lawn mower will be able to save time and wherein less effort will be required to operate the lawn mower, especially if there are shrubs, trees, hedges and the like to work around.

A further object of the invention is to provide a reversing mechanism for a power driven lawn mower which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the power driven lawn mower in position with the front wheels engaging the ground so that the lawn mower is driven forwardly and wherein the rear wheels are idling.

Figure 2 is a view similar to Figure 1 but showing the rear wheels in frictional engagement with the front wheels which are off the ground so that the reversing mechanism is in operative position.

Figure 3 is a rear elevational view of the lawn mower with the reversing mechanism thereon.

Figure 4 is a fragmentary side elevational view with the wheel 23 omitted and the shaft 27 in section.

Figure 5 is a view similar to Figure 4, but showing the reversing mechanism in operative relation as in Figure 2.

Referring in detail to the drawings, the numeral 10 designates a frame which may be fabricated of any suitable material, and mounted on the frame 10 is a power mechanism which may be a gasoline engine 11, there being a fuel tank 12 for supplying gasoline to the engine 11. The engine 11 may rotate a chain and sprocket mechanism 14 which in turn may drive a chain and sprocket mechanism 15, Figure 3, through the medium of a shaft 16. Supported within the frame 10 is the usual reel 17 which includes a plurality of cutting blades 18.

Secured to the frame 10 is a pair of bushings 19, and suitable handle bars 21 may each have a collar 22 on their lower front ends whereby the collars 22 can be connected to the bushings 19 by suitable pins 20.

The lawn mower further includes a pair of ground engaging front wheels 23. Depending from the frame 10 and secured thereto is a pair of spaced parallel vertically disposed securing elements or bolts 24, and a block 25 is connected to the lower end of each of the securing elements 24. Each of the blocks 25 is provided with a slot 26, Figures 4 and 5, and an axle 27 extends between the pair of blocks 25, the axle 27 extending through the slots 26. Mounted on the axle 27 is a pair of rear or trailing wheels 28. The wheels 28 are of less diameter than the wheels 23, and the wheels 28 are mounted behind and in alignment with the wheels 23. By depressing the handle bars 21, the lawn mower will be pivoted in a counterclockwise direction from the position shown in Figure 1 to the position shown in Figure 2 so that the axle 27 will move through the slot 26 from the position shown in Figure 4 to the position shown in Figure 5. This will cause the small rear wheels 28 to move into frictional engagement with the wheels 23. Thus, normally with the parts in the position shown in Figures 1 and 4 the engine 11 will drive the front wheels 23 in a clockwise direction so that the power driven lawn mower will move in a forward direction. The manner in which the engine drives the front wheels is conventional. Such a drive is shown, for example, by the patent to Rodesci 2,468,839, granted May 3, 1949. Then, with the rear wheels 28 in frictional engagement with the front wheels 23, as in Figures 2 and 5, the front wheels 23 will continue to be rotated in a clockwise direction, but the rear wheels 28 will be rotated in a counterclockwise direction so that the lawn mower will be automatically backed up or reversed without requiring any effort on the part of the operator.

From the foregoing, it is apparent that a reversing mechanism has been provided for a power driven lawn mower which will facilitate the use of the lawn mower since the lawn mower can be backed up without any effort on the part of the operator. In Figures 1 and 4 the lawn mower is shown in position for forward motion so that the idler wheels 28 are turning in a clockwise direction as the lawn mower moves forwardly. In Figures 2 and 5 the lawn mower reversing mechanism is shown in operating position. This is accomplished by depressing the handle bars 21 to thereby elevate the front wheels 23 from the ground or lawn contact whereby the frame will be rolled back on the axle 27 of the trailing wheels 28 so that the power driven front wheels 23 will ride on and rotate the trailing wheels 28 backwardly. With the parts in the position shown in Figures 2 and 5 the rear wheels 28 support the entire mower and propel it backwardly.

It is to be understood that the reversing mechanism of the present invention can be used on various types of lawn mowers and a high-low cutting adjustment can be provided on the lawn mower. It is to be understood that the rear wheels rotate freely on the axle 27.

From the above description, it will be seen that there has been provided a device of the character described which possesses the particular features of advantage that have been enumerated as desirable, but it is obviously susceptible of modification in its form, proportions, detailed construction and arrangement of parts without departing from the principles involved or sacrificing any of its advantages.

In order to comply with the statute, the invention has been described in language more or less specific regarding structural features, but it is to be understood that the invention is not limited to the specific features shown, and that the means and construction herein disclosed comprise the preferred form of several modes of putting the invention into effect, and the invention is thus claimed in any of its forms or modifications within legitimate and valid scope of the appended claims.

I claim:

1. In combination in a lawn mower, a frame, a power mechanism mounted on said frame, handle bars extending rearwardly from said frame and connected thereto, a cutting reel supported by said frame, a pair of vertically disposed front wheels arranged in spaced parallel relation with respect to each other, a pair of spaced parallel securing elements depending from said frame, a block connected to the lower end of each of said securing elements and each of said blocks being provided with a slot, an axle extending between said pair of blocks and extending through said slots, a pair of rear wheels connected to said axle, said rear wheels being mounted behind and in alignment with said front wheels and being mounted for movement into and out of frictional engagement with said front wheels.

2. The apparatus as described in claim 1, wherein said rear wheels cause the lawn mower to move backwardly when the rear wheels are in engagement with the front wheels.

3. In a lawn mower, a frame, a pair of vertically disposed front wheels arranged in spaced parallel relation with respect to each other, a pair of spaced parallel securing elements depending from said frame, a block connected to the lower end of each of said securing elements, each of said blocks being provided with a slot, an axle extending between said pair of blocks and extending through said slots, a pair of rear wheels connected to said axle, said rear wheels being mounted behind and in alignment with said front wheels and being mounted for movement into and out of frictional engagement with said front wheels.

4. A reversing mechanism for a power driven lawn mower of the type including a frame, inclined handle members extending upwardly and rearwardly from said frame, a pair of vertically disposed ground engaging front wheels arranged in spaced parallel relation with respect to each other, a pair of spaced parallel securing elements depending from said frame, a block connected to the lower end of each of said securing elements, said blocks being spaced inwardly from said wheels, each of said blocks being provided with a slot, an axle extending between said pair of blocks and extending through said slots, a pair of rear wheels connected to said axle, said rear wheels being mounted behind and in alignment with said front wheels and being mounted for movement into and out of frictional engagement with said front wheels, said rear wheels being of smaller diameter than said front wheels, said axle being positioned below the center of said front wheels, said rear wheels frictionally engaging said front wheels when the axle is moved to the front of said slots by bearing down on said handle members, and said axle being arranged in the rear of said slots when the rear wheels are out of frictional engagement with said front wheels, said front wheels being out of engagement with the ground and said rear wheels providing the sole support for the lawn mower when the lawn mower is being moved backwards.

References Cited in the file of this patent

UNITED STATES PATENTS

| Number | Name | Date |
| --- | --- | --- |
| 819,377 | Price | May 1, 1906 |
| 2,464,980 | Kuehn | Mar. 22, 1949 |
| 2,601,752 | Rose | July 1, 1952 |